United States Patent Office 3,480,539
Patented Nov. 25, 1969

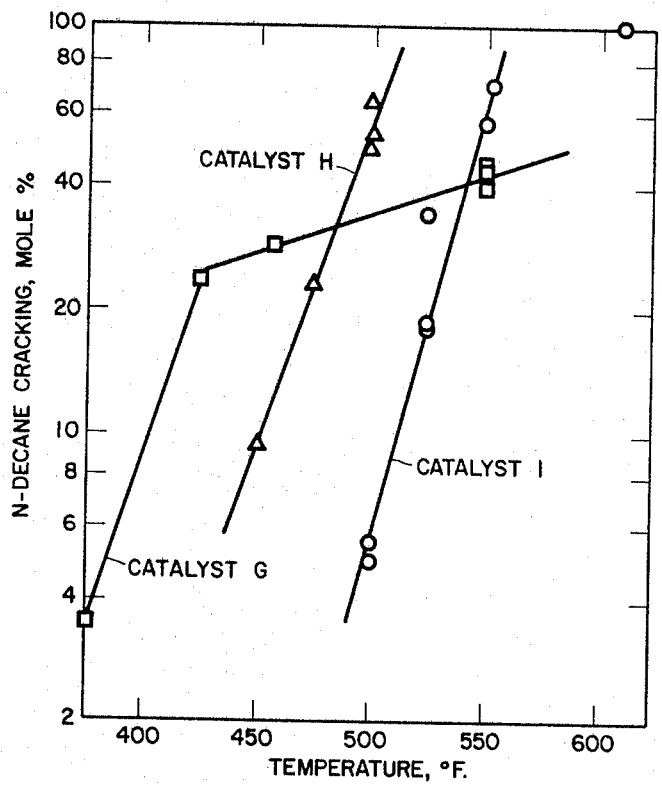

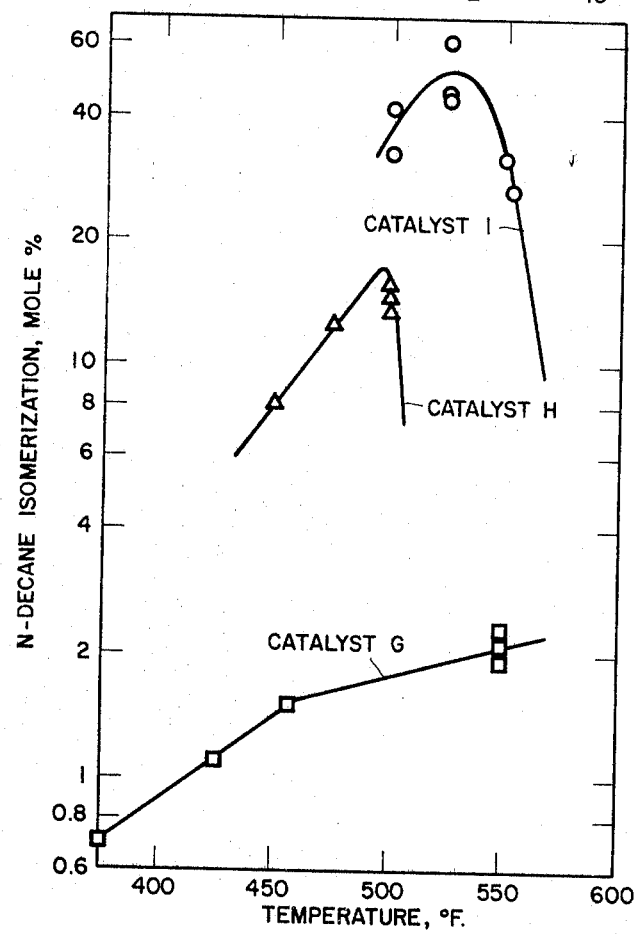

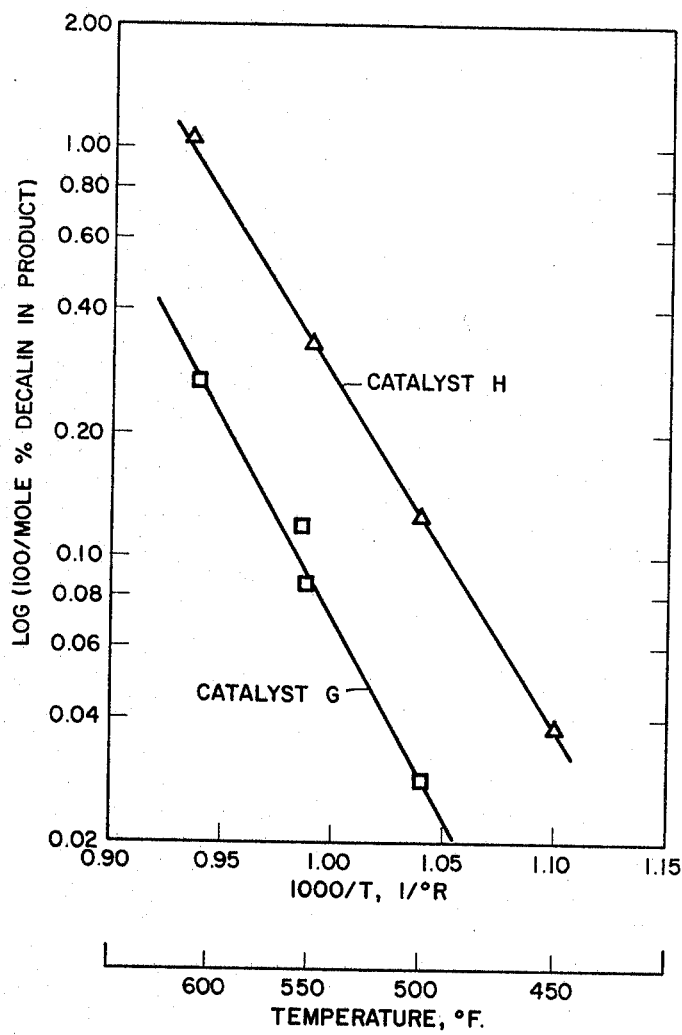

3,480,539
MORDENITE CATALYST COMPOSITIONS
Alexis Voorhies, Jr., Charles Newton Kimberlin, Jr., and Elroy Merle Gladrow, Baton Rouge, La., assignors to Esso Research and Engineering Company, a corporation of Delaware
Filed Oct. 14, 1966, Ser. No. 586,695
Int. Cl. B01j 11/60; C07c 5/14; C10g 35/08
U.S. Cl. 208—111    9 Claims

ABSTRACT OF THE DISCLOSURE

The catalytic properties of crystalline aluminosilicate zeolites having the mordenite crystal structure are improved by treating said zeolites with a mineral acid. The treatment is accomplished at conditions such that alumina is extracted from the crystalline lattice. The improved catalytic properties are obtained when sufficient alumina has been removed to increase the silica/alumina ratio to at least 25 to 1. Best results are obtained when this ratio is increased to a value greater than 55 to 1.

---

The present invention relates to improved forms of crystalline aluminosilicate zeolites having the mordenite crystal structure, processes for the preparation of such materials and hydrocarbon conversion processes utilizing such improved forms of mordenite as catalyst therein. In particular, the present invention concerns mordenite type crystalline aluminosilicate zeolites which have been made aluminum deficient by means of a mineral acid treatment at relatively severe conditions. More specifically, the present invention relates to mordenite catalyst compositions which due to an aluminum deficiency exhibit a substantially higher silica to alumina mole ratio than heretofore obtained for such materials and which aluminum deficient type mordenites exhibit unexpected catalytic properties in hydrocarbon conversion reactions such as hydrocracking, cracking and hydroisomerization, among others.

Mordenite is a highly siliceous zeolite occurring in a number of localities, e.g., Nova Scotia (Cape d'Or), Iceland (Berufiord) and Idaho (Challis). This zeolite has been synthesized repeatedly and its molecular sieve properties have been investigated in some detail. See in this connection R. M. Barrer, Die Trennung von Molekülen mit Hilfe von Kristallsieben, Brennstoff-Chemie 35, 325–334 (1954).

Mordenite generally is characterized by its high silicon to aluminum ratio of about 5:1 in its crystal structure. The ratio of silicon to aluminum atoms in mordenite may also be conveniently expressed in terms of a molecular ratio of silica ($SiO_2$) to alumina ($Al_2O_3$). The proposed structure for mordenite is one in which the basic building block is a tetrahedron consisting of one silicon or aluminum atom surrounded by 4 oxygen atoms; oxygen atoms are shared by adjacent tetrahedra. The crystal is made up of chains of 4 and 5-membered rings of these tetrahedra. The chains are linked together to form a network having a system of large parallel channels interconnected by small cross channels. This structure indicates that mordenite should have large parallel channels with free diameters of the order of 6.6 A., while the smaller interconnecting channels parallel to the axis of the large channels have free diameters of the order of 2.8 A. Mordenite is usually obtained as the sodium salt and has a unit cell which corresponds approximately to the formula:

$$Na_8(AlO_2)_8(SiO_2)_{40} \cdot 24H_2O$$

In order to effectively utilize mordenite as a hydrocarbon conversion catalyst, it has been found necessary to base exchange the zeolite so as to substitute a catalytically active metal cation for a substantial portion of the originally contained sodium cation. Since mordenite has a relatively high initial silica to alumina mole ratio, it is reasonably stable to acid treatment. Therefore, the art has suggested washing the mordenite at ambient conditions with a mineral acid to effect replacement of some of the original metal ions with hydrogen ion. For example, in British Patent No. 1,022,687, published Mar. 16, 1966, it is suggested that mordenite be treated with 0.1 N hydrochloric acid for 15 minutes followed by a treatment with 1.2 N hydrochloric acid for an additional 15 minutes at room temperature to effectuate exchange of at least 50% of the original metal cation content of the mordenite.

A similar disclosure is to be found in South African Patent No. 65/0922, published Feb. 22, 1965, to British Petroleum Company, which patent further indicates that mordenite treated with a mineral acid will lose about 1 atom of aluminum per unit cell of the mordenite crystal lattice. This lost aluminum is believed to be replaced by 4 hydroxyl groups.

Still another procedure for substituting hydrogen ion for the original metal cation content of crystalline aluminosilicate zeolite molecular sieves with concomitant loss of aluminum to thereby enhance the silica to alumina mole ratio is to be found in South African Patent No. 64/0472, granted Feb. 3, 1964 to Kerr et al. Patentees teach a process for the selective complexing of alumina from crystalline aluminosilicate zeolites by using a chelating agent such as di(tetraethyl ammonium) dihydrogen ethylene diamine tetraacetic acid or acetate. Molecular sieves such as the Y form are obtained having a silica to alumina mole ratio as high as 18/1. The main objectives in treating the crystalline aluminosilicate molecular sieves in the manner suggested by Kerr et al. were to effect increased acid stability and also to increase the adsorptive capacity of the molecular sieve material.

In a more recent French patent, No. 1,427,463, obtained by Socony Mobil Oil Company, it is disclosed that the volume of pores of crystalline aluminosilicate zeolites can be increased by treating such materials with a mineral acid at ambient temperatures. The pore volume enhancement is obtained by means of removal of alumina from the crystal structure thereby enhancing the silica to alumina mole ratio. The maximum amount of alumina removed by this treatment is indicated by patentees to be about 50% of the original level. Thus, for a mordenite starting material, a final silica to alumina mole ratio of about 20/1 would be indicated. As before, the main objective in effecting this removal of alumina is to increase the adsorptive capacity of the molecular sieve.

It has now been found, and as such forms the basis of the present invention, that crystalline aluminosilicate zeolite molecular sieves of the mordenite type can be treated with mineral acids under relatively severe conditions of temperature and contact time to effectuate removal of a substantial amount of the alumina originally present in the crystal lattice. By utilizing a severe alumina removal procedure, silica to alumina mole ratios extremely higher than that previously obtained by the art are produced. These highly aluminum-deficient mordenite zeolites maintain the gross crystal structure of mordenite as evidenced by their X-ray diffraction patterns but unexpectedly are found to exhibit a different kind of catalytic activity than the mordenite catalyst having the initial or near initial silica to alumina mole ratio. This difference in catalytic activity is shown by a different temperature-activity response and a different product pattern when such alumina-deficient mordenites are utilized in hydrocarbon conversion reactions such as hydrocracking, hydroisomerization and other similar reactions.

The severe conditions utilized in preparing the alumina-deficient mordenites of the present invention involve treating the mordenite with a realtively concentrated mineral acid or acid of equivalent strength at elevated temperatures for a period in the range of from 1 to 24 hours, preferably from 2 to 8 hours. For best results, the concentration of the mineral acid should be at least 1 N and more preferably should be in the range of from 2 N to 8 N. Temperatures which may be used to effectuate the high degree of alumina removal desired can be in the range of from room temperature to 220° F., more preferably in the range of from 180° F. to 212° F.

It must of course be understood that, since several variables are involved in the process for removing the alumina, it is within the ordinary skill of a chemist to select from the aforementioned ranges particular values which would still result in the desired severe conditions; that is, if temperatures in the lower portion of the disclosed range are utilized, it would be desirable to either increase the acid strength or to increase the contact time of the acid with the mordenite in order to maintain a high degree of alumina removal. Similarly, if a shorter contact would be desired, suitable adjustment in the acid strength or temperature would be made to maintain the over-all severe conditions.

Utilization of the conditions given above results in the production of an aluminum-deficient mordenite having an extremely high ratio of silica to alumina. Generally, this ratio will exceed 25/1 and in more preferable embodiments will be greater than 55/1. In particularly preferred embodiments, the silica to alumina mole ratio of mordenites obtained by the process of the present invention will be in the range of about 60/1 to 100/1 or even higher.

These highly aluminum-deficient mordenites retain the gross crystal structure of the starting mordenite material. The conditions for the alumina removal should be selected so as not to cause extensive decomposition of the crystallinity of the starting mordenite. One such way of achieving this is to add the acid slowly to an aqueous slurry of the mordenite until the desired amount for the treat has been introduced. Materials so treated, when washed and dried, show essentially no diminution in the intensity of the X-ray diffraction lines for mordenite.

The mordenite utilized in the preparation of the aluminum-deficient form may be of the natural or synthetic variety. Additionally, it can be in the sodium or any other metal cation form prior to treatment with the acid since the acid catalyzed removal of alumina will result in concomitant ion exchange with hydrogen ion. Similarly, the original mordenite material may already have been partially or completely ion exchanged to the hydrogen form prior to the acid treatment.

The acid solution utilized to extract the alumina from the mordenite may be a dilute solution of a mineral acid such as hydrochloric acid, sulfuric acid or nitric acid. It is preferred that the acid content of such solutions be at least 1 N, more preferably at least 4 N. Other inorganic or organic acids may be utilized also but they should have at least the same acid strength as the mineral acids have at the maximum dilution levels given above. Suitable acids of this type include phosphoric, acetic, chloroacetic, trichloroacetic, citric, tartaric and hydrobromic acids.

In order to utilize the aluminum-deficient mordenite of the present invention in hydrocarbon conversion reactions wherein hydrogenation conditions are employed, it is within the scope of the present invention to composite the aforesaid aluminum-deficient mordenite catalyst with from 0.05 to 2.0, preferably 0.2 to 0.8 wt. percent of a platinum group metal. Particularly preferred platinum group metals for use in such hydrogenation reactions include platinum and palladium. These metals can be incorporated into the aluminum-deficient mordenite by impregnation or by cation exchange using techniques now well known in the art.

The present invention will be made more clear by reference to the following examples.

Example 1

400 grams of $NH_4^+$ form modernite which had been oven dried at 250° F. are slurried in 750 cc. $H_2O$ contained in a 2-liter round bottom flask. The slurry is heated to reflux temperature with stirring. To the slurry, 25–50 cc. increments of 12 N HCl until a total of 750 cc. of the acid are added. The slurry is refluxed with stirring, for 8 hours, filtered while hot, washed well with water and oven dried. This material is designated "A." It analyzed 1.8% $Al_2O_3$ and 98.2% $SiO_2$ which corresponds to a $SiO_2/Al_2O_3$ mole ratio of about 93. It showed a relative crystallinity of 169% when compared to pure synthetic Na-mordenite.

In similar fashion, separate portions of the same batch of $NH_4^+$ form mordenite were treated with HCl of varying concentration over a number of time periods. The data are shown in the following tabulation:

TABLE I

| Sample | HCl Conc. | Contact Time, Hours | Mole Ratio $SiO_2/Al_2O_3$ | Relative Crystallinity, Percent |
|---|---|---|---|---|
| B | 0.75 N | 1 | 13 |  |
| C | 6 N | 2 | 69 | 160 |
| D | 6 N | 4 | 93 | 180 |
| E | 6 N | 8 | 89 |  |
| F | 6 N | 14 | 90 | 119 |

These data show that alumina can be extracted to the level where the $SiO_2/Al_2O_3$ ratio of the treated material is in the range of about 70–90 or higher with no apparent loss of crystallinity.

Example 2

The aluminum-deficient mordentite base material A, prepared by the method of Example 1, and having a $SiO_2/Al_2O_3$ mole ratio of about 93 was composited with 0.5% palladium and tested for hydrocracking activity on a normal decane feed stream. Comparison runs were made utilizing an untreated hydrogen form of mordenite which has a silica to alumina mole ratio of about 10/1 and containing 0.5% palladium and an excellent hydrocracking catalyst consisting of the mixed hydrogen-magnesium forms of faujasite. The latter catalyst also contained 0.5% palladium. The results are tabulated in a graph contained in FIGURE 1 wherein catalyst G is the untreated hydrogen form of mordenite composited with 0.5% palladium, catalyst H is then aluminum-deficient hydrogen mordenite of the present invention (sample A of Example 1) composited with 0.5% palladium and catalyst I is the faujasite hydrocracking catalyst also composited with 0.5% palladium.

Examination of FIGURE 1 indicates clearly that the catalyst based on the highly aluminum-deficient mordenite (H) behaves radically different from the catalyst based on ordinary hydrogen mordenite. The ordinary mordenite catalyst (G) is very sluggish in temperature response above 450° F. (an additional 160° F. is required to double percent cracking), whereas the catalyst H of the present invention shows about the same temperature response (15° F. to double the conversion) as the faujasite base catalyst (I), while enjoying a 50° F. advantage in activity. It should further be noted that the catalyst of the present invention (catalyst H) is not hindered in activity at high levels of cracking which is the case with the untreated hydrogen mordenite based catalyst G.

The data obtained in the hydrocracking runs on n-decane with catalysts G, H and I also illustrate striking differences in the ratio of iso to normal paraffins in the butane, pentane and hexane fractions of the hydrocracked products. This is illustrated in Table II for typical runs with the three catalysts at a cracking level in the range of 45 to 57% and in the temperature range of 500 to 550° F.

TABLE II.—EFFECT OF CATALYST TYPE ON PRODUCT DISTRIBUTION FOR HYDROCRACKING OF N-DECANE WITH PD IMPREGNATED ZEOLITE CATALYSTS

Common Conditions: 450 p.s.i.g., 2 v./v./hr., 10 moles $H_2$/mole n-$C_{10}$

| Catalyst | G | H | I |
|---|---|---|---|
| Temperature, °F | 550 | 500 | 550 |
| Cracking, mole percent | 45.0 | 51.0 | 56.8 |
| Product, moles per 100 moles n-$C_{10}$ feed: | | | |
| Methane | 0.0 | 0.0 | 0.0 |
| Ethane | 3.4 | 0.0 | 0.0 |
| Propane | 37.3 | 4.3 | 7.1 |
| I-Butane | 18.1 | 24.9 | 20.5 |
| N-Butane | 19.5 | 4.9 | 9.7 |
| I-Pentane | 18.5 | 40.3 | 29.6 |
| N-Pentane | 6.4 | 7.1 | 13.0 |
| I-Hexane | 7.3 | 18.4 | 23.7 |
| N-Hexane | 1.6 | 1.9 | 6.5 |
| $C_7/C_9$ | 0.8 | 2.0 | 4.3 |
| I-Decane | 2.1 | 15.7 | 31.3 |
| N-Decane | 52.9 | 33.3 | 11.9 |
| I/N $C_4$ | 0.9 | 5.1 | 2.1 |
| I/N $C_5$ | 2.9 | 5.7 | 2.3 |
| I/N $C_6$ | 4.6 | 9.7 | 3.6 |

Examination of Table II indicates that the product distribution obtained from the palladium on aluminum-deficient hydrogen mordenite (catalyst H) is markedly different from that given by palladium on ordinary hydrogen mordenite (catalyst G). This is evident in the much higher ratio of iso to normal paraffins in the butane, pentane and hexane fractions. It is also evident that the palladium on aluminum-deficient hydrogen mordenite of the present invention (catalyst H) also gives a much higher iso to normal ratio in the $C_4$ to $C_6$ paraffins than does the catalyst based on faujasite (catalyst I).

These hydrocracking tests also show interesting isomerization properties of these catalysts as a function of temperature. This is shown in FIGURE 2 which shows that the palladium on aluminum-deficient hydrogen mordenite (catalyst H) exhibits an activity pattern with respect to temperature similar to that of the catalyst based on faujasite (catalyst I) and additionally exhibits an extremely dissimilar pattern to that exhibited by palladium on ordinary hydrogen mordenite (catalyst G).

Example 3

Another assessment of the hydrocracking activity of the catalyst of the present invention was made in a series of tests using decahydronaphthalene (Decalin). The catalyst used was the same as that employed in Example 2 (catalyst H) and which has a $SiO_2/Al_2O_3$ mole ratio of about 93. Companion runs were also made with catalyst G.

The hydrocracking activity of catalysts G and H are shown in an Arrhenius type of graph in FIGURE 3. The abscissa is the usual reciprocal of the absolute temperature; the ordinate is the log of a function that is approximately proportional to the reaction rate constant. This function is represented by the expression: log (100/mole percent Decalin in product).

Comparison between the catalysts can be made at various temperatures from FIGURE 3 by noting the ratio of the corresponding numerical values of the ordinate. Thus, it is seen that in the temperature range of 500° F. to 600° F. the catalyst of this invention (catalyst H) is approximately 3.5 to 4.0 times as active as the catalyst based on untreated hydrogen mordenite (catalyst G).

Example 4

Material C of Example 1, having a $SiO_2/Al_2O_3$ mole ratio of about 69, was composited with 0.5% palladium and examined for hydroisomerization activity using a desulfurized $C_5/C_6$ virgin naphtha fraction from Aramco Middle East Crude Oil. This catalyst is designated "J." Comparison runs were made with catalyst "G" and with a mildly aluminum-deficient hydrogen mordenite based catalyst having a $SiO_2/Al_2O_3$ mole ratio of about 13 (sample B of Example 1 composited with 0.5% palladium) and which is designated catalyst K. The data are summarized in Table III.

TABLE III.—EFFECT OF CATALYST TYPE ON ACTIVITY AND SELECTIVITY FOR HYDROISOMERIZATION OF ARAMCO $C_5/C_6$ VIRGIN NAPHTHA

Common Conditions: 450 p.s.i.g., 4,600 s.c.f. of $H_2$/bbl. of feed

| | Catalyst | | | | |
|---|---|---|---|---|---|
| | J | | K | | G |
| $SiO_2/Al_2O_3$ Mole Ratio | 69 | | 13 | | 10 |
| Temperature, °F | 550 | 500 | 500 | 550 | 500 |
| V./v./hr | 2.0 | 1.1 | 2.0 | 2.0 | 2.0 |
| Wt. percent yield: $C_4$ and lighter | 4.2 | 1.7 | 3.1 | 16.1 | 3.6 |
| Ratio of iso to total paraffins: | | | | | |
| Product $C_5$ | 0.59 | 0.42 | 0.35 | 0.66 | 0.42 |
| Equilibrium value | 0.69 | 0.70 | 0.70 | 0.60 | 0.70 |
| Product $C_6$ | 0.83 | 0.75 | 0.65 | 0.85 | 0.70 |
| Equilibrium value | 0.82 | 0.84 | 0.84 | 0.82 | 0.84 |

The relative selectivity and activity of these three catalysts can be deduced from the data in Table III. Better selectivity is denoted by a lower yield of $C_4$ and lighter for a given approach to equilibrium isomerization; and higher activity is denoted by a closer approach to equilibrium isomerization for a given set of operating conditions. The following conclusions can be drawn:

(1) As compared to the ordinary hydrogen mordenite catalyst G, the highly aluminum-deficient hydrogen mordenite catalyst J is definitely more selective and somewhat more active for the $C_5/C_6$ isomerization at 500° F.; at the more severe 550° F. level, catalyst J is about as active as catalyst G for isomerization.

(2) The mildly aluminum deficient hydrogen mordenite catalyst K has about the same selectivity and slightly less activity than the ordinary hydrogen mordenite catalyst (column 3 versus column 5).

Thus, it is seen that a highly aluminum-deficient hydrogen mordenite based catalyst of this invention, J, makes an isomerization catalyst of definitely improved selectivity, whereas the mildly aluminum-deficient hydrogen mordenite based catalyst, K, excluded from this invention, shows no superiority in selectivity or activity over ordinary hydrogen mordenite as a catalyst base (G).

While the preceding discussion and examples have been limited to the use of catalyst compositions of the aluminum-deficient hydrogen mordenite type, it is within the scope of the present invention to exchange at least part of the hydrogen cation content of the aluminum deficient mordenite with a cation of a metal having desirable catalytic properties or mixtures of such cations. Examples of such metal cations include aluminum, beryllium, calcium, cerium, chromium, magnesium, manganese, strontium, zinc, silver, gold, copper, iron, nickel, antimony, bismuth and the rare earth metals taken either individually or more preferably as the mixed rare earths of commerce. Representative rare earth metal cations include cerium, lanthanum, praseodynium, neodynium, samarium, europium, gadolinium, terbium, dyprosium, holmium, erbium, thulium, ytterbium and lutetium. The commercial rare earth mixtures generally include lanthanum, cerium, praseodynium, neodynium, samarium and gadolinium.

The above metal cations are introduced into the exchange positions of the mordenite by methods well known in the art. It is preferable that the metal cation exchange be accomplished after the modenite has been acid extracted so as to preserve the metal content since if it were done prior to the extraction some if not all of the metal cation content might be lost by exchange with the acid hydrogen ions.

The metal cation containing aluminum deficient mordenites are superior catalysts in hydrocarbon conversion reactions such as cracking, hydrocracking, hydroisomerization, disproportionation, reforming, alkylation, dealkylation, hydrogenation, dehydrogenation, hydration, hydrodehalogenation, among others. They may be used in conjunction with added hydrogenation-dehydrogenation metal components such as nickel, platinum, palladium, cobalt, molybdenum, and tungsten. Additionally, the catalyst compositions of the present invention may be suspended in an inorganic oxide gel or clay matrix to form catalyst composites having superior physical properties such as attrition resistance, hardness, density, porosity, etc. Such catalyst composites are of particular utility in fluidized operations such as in fluid catalytic cracking.

It should further be noted that the catalyst compositions of the present invention are useful in the hydrocarbon conversion reactions listed above at essentially the same conditions which have been established for other forms of mordenite in the same reactions in the art.

What is claimed is:

1. An improved hydrocarbon conversion process comprising contacting a hydrocarbon feed stream at hydrocarbon conversion conditions with a catalyst composition comprising a highly aluminum deficient mordenite having at least a portion of its exchangeable cation sites occupied by hydrogen cations wherein the silica to alumina mole ratio of said mordenite is at least 55/1.

2. The improved process of claim 1 wherein said silica to alumina mole ratio of said aluminum deficient hydrogen mordenite is in the range of about 60 to 100/1.

3. The improved process of claim 1 wherein said hydrocarbon conversion reaction is a hydrocracking reaction and said catalyst composition additionally comprises 0.5–2.0 wt. percent of a platinum group metal.

4. The improved process of claim 1 wherein said hydrocarbon conversion reaction is a hydroisomerization reaction and said catalyst composition additionally comprises 0.5–2.0 wt. percent of a platinum group metal.

5. An improved catalyst composition comprising a highly aluminum deficient mordenite having at least a portion of its exchangeable cation sites occupied by hydrogen cations wherein the silica to alumina mole ratio of said mordenite is at least 55/1.

6. The improved composition of claim 5 wherein the silica to alumina mole ratio of said mordenite is in the range of about 60 to 100/1.

7. The improved composition of claim 5 wherein said catalyst composition additionally comprises 0.5–2.0 wt. percent of a platinum group metal.

8. The improved composition of claim 5 wherein said mordenite has at least a portion of its exchangeable cation sites occupied by cations of a catalytically active metal.

9. The improved composition of claim 5 wherein said catalyst is composited with an inorganic matrix material selected from the class consisting of clays and inorganic oxide gels so as to form a composition having superior physical properties.

References Cited
UNITED STATES PATENTS

| | | | |
|---|---|---|---|
| 2,253,285 | 8/1941 | Connolly | 252—455 X |
| 2,971,904 | 2/1961 | Gladrow et al. | 252—455 X |
| 3,130,006 | 4/1964 | Rabo et al. | 252—455 X |
| 3,367,884 | 2/1968 | Reid | 252—455 |

DANIEL E. WYMAN, Primary Examiner

C. F. DEES, Assistant Examiner

U.S. Cl. X.R.

252—455